United States Patent [19]

Kiiskilä

[11] Patent Number: 4,738,835

[45] Date of Patent: Apr. 19, 1988

[54] METHOD OF RECOVERING ALKALI CHEMICALS FROM FLUE GASES CONTAINING ALKALI METAL VAPOR

[75] Inventor: Erkki J. Kiiskilä, Kotka, Finland

[73] Assignee: A. Ahlstrom Corporation, Karhula, Finland

[21] Appl. No.: 14,062

[22] PCT Filed: May 16, 1986

[86] PCT No.: PCT/FI86/00049

§ 371 Date: Dec. 16, 1986

§ 102(e) Date: Dec. 16, 1986

[87] PCT Pub. No.: WO86/07104

PCT Pub. Date: Dec. 4, 1986

[30] Foreign Application Priority Data

May 22, 1985 [FI] Finland .................................. 852033

[51] Int. Cl.$^4$ .............................................. C01D 1/02
[52] U.S. Cl. .................................... 423/200; 423/179;
423/208; 423/210; 423/641; 423/DIG. 3;
423/DIG. 6; 423/DIG. 10; 162/30.1;
162/30.11; 48/197 R
[58] Field of Search ............ 423/179, 200, 208, 215.5,
423/641, DIG. 3, DIG. 10, 210, DIG. 6;
162/30.1, 30.11; 48/197 R

[56] References Cited

U.S. PATENT DOCUMENTS

| | | | |
|---|---|---|---|
| 1,719,130 | 7/1929 | Richter et al. | 162/30.1 |
| 3,322,492 | 5/1967 | Flood | 162/30.11 |
| 3,439,724 | 4/1969 | Mason | 423/215.5 |
| 4,208,383 | 6/1980 | Kisters et al. | 423/215.5 |
| 4,244,779 | 1/1981 | Nieminen | 162/30.1 |
| 4,303,469 | 12/1981 | Dinovo et al. | 162/30.11 |
| 4,312,702 | 1/1982 | Tomlinson, II | 423/207 |
| 4,377,439 | 3/1983 | Liem | 423/DIG. 3 |
| 4,391,880 | 7/1983 | Tsao | 423/659 |
| 4,439,272 | 3/1984 | Nguyen | 423/207 |
| 4,526,760 | 7/1985 | Empie, Jr. | 162/30.11 |

FOREIGN PATENT DOCUMENTS 3022459  7/1983  Sweden ............................ 162/30.1

Primary Examiner—Helen M. S. Sneed
Assistant Examiner—Anthony McFarlane
Attorney, Agent, or Firm—Nixon & Vanderhye

[57] ABSTRACT

A method of recovering alkaline chemicals from a material containing sodium or potassium compounds. The material is gasified by an external heat source after which the gas is rapidly cooled by arranging it to contact with cooled solid particles separated from the gas.

25 Claims, 1 Drawing Sheet

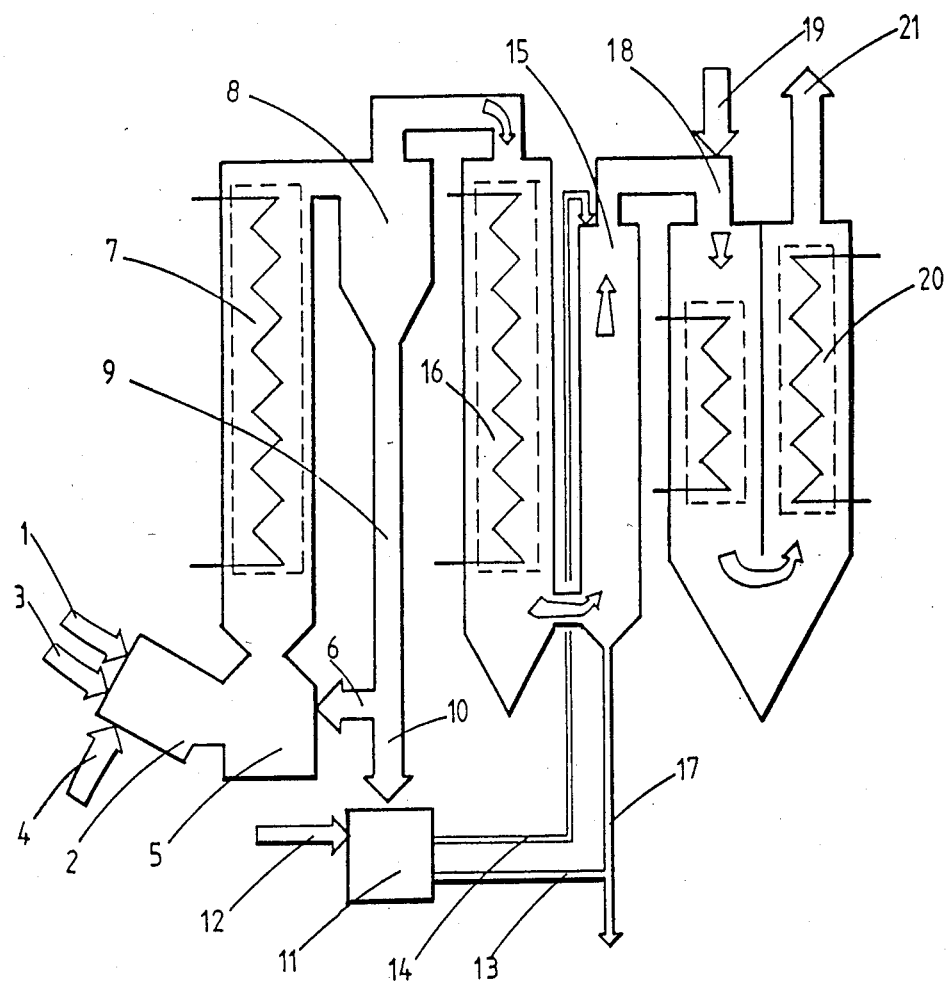

METHOD OF RECOVERING ALKALI CHEMICALS FROM FLUE GASES CONTAINING ALKALI METAL VAPOR

TECHNICAL FIELD

The present invention relates to a method of recovering alkali chemicals from a material containing inorganic dissolved compounds, which contain sodium and-/or potassium by which method the material is gasified in a reactor by an external heat source at a temperature of preferably over 1000° C. thus producing gas in which the sodium and the potential potassium are substantially in a gaseous state, which gas is then cooled.

BACKGROUND ART

When spent pulping liquor containing sodium or potassium salts is combusted in order to recover the heat content of the organic material dissolved during the cooking and the chemicals contained in the spent liquor, the alkali metals begin to vaporize to a gas phase when the temperature exceeds 1000° C.; the smaller the air coefficient and the higher the temperature is, the intenser the vaporization becomes. By supplying the strongly substoichiometric combustion with additional heat energy by preheating with plasma, auxiliary fuel or other combustion gas, it is theoretically possible to reach conditions where e.g. the combustion of sulfate black liquor produces gas the temperature of which is over 1000° C., even 1500° C., and which contains CO, $CO_2$, $H_2O$ and $H_2S$ and in which the alkali metals are substantially in the form of a monotomic gas. This is disclosed by the Swedish patent application No. 8302245.9.

The application also discloses a method of condensing the alkali salts to a melt or to an aqueous solution from the gas phase by cooling the gas produced by the combustion as described above whereby the cooking chemicals are directly recovered as NaOH and $Na_2S$.

In order to recover the cooking chemicals directly, it is necessary to cool the gas very quickly to prevent the $CO_2$ contained in the gas from reacting with NaOH or $Na_2O$ to form sodium carbonate. If sodium carbonate is formed, the advantage provided by the method, i.e. the direct production of cooking chemicals, e.g. NaOH, is lost.

In conventional cooling the $NaOH/Na_2O/Na$ is condensed onto the cooling surface in the melt temperature range concerned and forms a layer the thickness of which increases until the surface temperature reaches the melting point. The condensed material is removed slowly from the cooling surfaces, providing the melt with a long contact time with the $CO_2$ in the gas. The heat transfer is decreased. The melt layer is corroding and decreases the heat exchange capacity, it also shortens the endurance expectancy of the device. Finally, the gas is cooled slowly and the $Na_2C_3$ content in the melt increases with the result that it is no longer an advantage to use the melt directly as a cooking chemical.

DISCLOSURE OF THE INVENTION

The present invention provides a remarkable improvement to the above. The cooling of the vaporized alkali metal compounds is controlled and rapid whereby the formation of sodium carbonate is minimized. No corroding melt condensates are produced.

The method of the invention is characterized by the feature of cooling the gas from the gasification reactor by bringing it into contact with an adequate amount of cooled recirculated solid particles, which are separated from the gas, to decrease the temperature of the gas rapidly below the sublimation temperature of sodium or potassium compounds.

The present invention is particularly applicable to the recovery of alkali chemicals from the spent liquor of cellulose cooking.

The method of the invention provides very rapid and efficient cooling of the gas. When the gas is mixed with the small circulating bed particles which move fast, the heat is quickly divided evenly between the particles and the gas. Further, the combined area of the cooled particles mixed with the hot gas flow is very large thus providing a large heat exchange area which results in very rapid cooling of the gas below the sublimation temperature. In general the cooling speed is of the order of 500°-1000° C./s or greater.

When the cooling is carried out by mixing cold, cooled particles separated from the gas flow, to the hot gas flow to decrease the temperature of the suspension of gas and solid material rapidly enough below the sublimation temperature of the gaseous sodium or potassium compounds the above mentioned condensation takes place by sublimating the sodium or potassium compounds directly as a solid layer onto the surface of the particles. At the same time the gas is cooled past the critical temperature range (approx. 500°-1000° C.) so rapidly that the formation of carbonate is practically impossible.

By bringing the gas into contact with a large amount of circulating particles, the advantage of cooling the gas rapidly below the temperature (500°-1000° C.), which is kinetically advantageous for the formation of carbonate, is achieved, further the gas is rapidly cooled below the sublimation point of the solid material, which is an advantage for the operation of the device.

The method of the invention makes feasible a compact device in which the cooling of the gas is controlled without the formation of melt and in which the formation of carbonate is minimized.

In gasification of the spent pulping liquor from e.g. sulfate cellulose cooking, the circulating particles consist of sublimated alkali compounds, mainly $Na_2O$/NaOH and $Na_2S$.

To reach balance, a part of the particles must be removed from the cooling circulation. For instance, by dissolving the above particles in water, a strong NaOH solution containing $Na_2S$ is produced which can be used for washing out the $H_2S$ remaining in the gas phase. Alternatively the gas can also be treated following the after-burning in which case $SO_2$ is removed from the gas.

BRIEF DESCRIPTION OF THE DRAWINGS

The invention is described further below with reference to the drawing which illustrates schematically a method according to the invention for the recovery of alkali chemicals.

MODE OF CARRYING OUT THE INVENTION

In the FIGURE, the spent liquor from a sulfate cellulose cooking is introduced through an inlet 1 to a gasification chamber 2 in which the spent liquor is gasified at a temperature of over 1000° C. by an external heat source 3, such as a plasma generator. Before the gasification the spent liquor has preferably been evaporated or e.g. spray dried by a method not illustrated in the FIGURE. Auxiliary fuel or e.g. oxygen can be introduced into the gasification chamber through an inlet 4. The gasification of sulfate spent liquor is carried out at an oxygen deficit in order to cause the sulfur to form hydrogen sulfide and not sulfur dioxide. If liquor that do not contain sulfur is gasified the gasification can be carried out in an excess of air.

The gas produced by the gasification is guided to a sublimation chamber 5 where the gas is mixed with the cooled recirculated particles brought to the sublimation chamber through conduit 6. The sodium contained in the spent liquor, which after the gasification is substantially in the form of a monotomic gas, is rapidly sublimated and in a solid state passed on with the gas and the circulating particles up to and through a heat exchanger 7 where the particles are cooled. The sodium is sublimated essentially to NaOH, Na$_2$O and Na$_2$S. After the heat exchanger the cooled solid particles are separated from the gas in a cyclone 8. The solid particles separated from the gas are transported through pipe 9 either to the conduit 6 and back to the sublimation chamber or to a conduit 10 and therefrom to a dissolving chamber 11. The cooling of the gas in the sublimation phase in the circulating bed cooler can be controlled by controlling the amount of particles recirculated through conduit 6. When alkali is sublimating onto the surface of the particles the size of the particles increases and at a predetermined size the particles are removed from the circulation into the dissolving chamber.

In the dissolving chamber, NaOH and Na$_2$S is dissolved from the separated particles in water. The water is brought to the chamber through a pipe 12. A part of the aqueous solution containing alkali chemicals is transferred through a pipe 13 to the digester to be used as a cooking chemical, and a part of the water solution is guided through a pipe 14 to a gas washer 15.

The gas separated in the cyclone is conducted through a heat exchanger 16 to the scrubber 15, where sulfur containing compounds and the solid material, which was not separated in the cyclone, are removed from the gas. The obtained solution is added through a pipe 17 to the aqueous solution fed into the digester.

After washing the gas is combusted in a chamber 18. Air or oxygen in supplied through a channel 19. After this the gases are guided through heat exchangers 20 to a gas outlet 21.

Instead of a cyclone, several other methods of separating the particles can be used, e.g. an electric filter which provides the advantages of a small pressure drop and high separation rate if necessary.

The solid particles can alternatively be cooled in a separate device disposed after the cyclone e.g. by air. In this case the heat exchanger 7 is not needed. Cooling of the gas can be controlled by controlling the flow velocity of the particles or by controlling the temperature of the particles by means of the heat exchanger 7.

Heat may be recovered from the gas before the alkali compounds are separated from the gas. Also heat may be recovered from the sublimated alkali compounds after they have been separated from the gas.

EXAMPLE

A test run was performed in a pilot plant device, in which alkali compounds, mostly potassium and sodium chlorides, were recovered from the flue gases of a cement clinker furnace by cooling the gas in a circulating bed cooler. The flue gases, which leave the furnace at a temperature of over 1000° C., were supplied to the sublimation chamber or the mixing phase of a cooler through a pipe of approx. 2 meter. The flow velocity in the pipe was approx. 30 m/s. The temperature of the gas when it came to the mixing phase was approx. 860°–880° C. and when it left the mixing phase approx. 265°–285° C. The cooling speed in the test run was 2070°–2425° C./s.

The gas cooling speed and the temperatures at different phases were

|  | 1 | 2 | 3 |
| --- | --- | --- | --- |
| Temperature after cement furnace, i.e. inlet temperature °C. | approx. 1000 | approx. 1000 | approx. 1000 |
| temp. before mixing °C. | 860 | 880 | 870 |
| temp. after mixing phase °C. | 265 | 275 | 282 |
| temp. after cooler before cyclone °C. | 215 | 230 | 235 |
| gas volume m$^3$n/s | 0,100 | 0,119 | 0,125 |
| time in suction channel and sublimation chamber s | 0,355 | 0,308 | 0,296 |
| cooling speed °C./s | 2070 | 2350 | 2425 |

Industrial Applicability

The invention is not limited to the embodiment presented here as an example only but it can be modified and applied in several ways within the scope of protection defined by the patent claims, e.g. in particular the recovery of chemicals after cellulose cooking is possible by this method.

We claim:

1. A method of recovering alkali chemicals from a material containing dissolved inorganic compounds containing sodium comprising the steps of:
   gasifying the material in a reactor by an external heat source at a temperature of over about 1000° C., thus producing gas in which the sodium is substantially in a gaseous state;
   cooling the gas by bringing it into contact with an adequate amount of cooled recirculated solid particles in a sublimation chamber of a circulating bed cooler to decrease the temperature of the gas rapidly below the sublimation temperature of the sodium compounds so that said sodium compounds are sublimated onto said solid particles;
   passing the gas and solid particles upwardly through heat exchange means to cool said solid particles; and
   separating the solid particles from the gas and recirculating some of said cooled solid particles to said sublimation chamber.

2. A method as recited in claim 1 wherein after separation from the gas, a portion of said solid particles are transported to a dissolving chamber wherein the sublimated compounds are dissolved in water to produce cooking chemicals.

3. A method as recited in claim 2 comprising the further step of recovering heat from the gas in said heat exchanger before the alkali compounds are separated from the gas.

4. A method as recited in claim 2 comprising the further step of recovering heat from the sublimated alkali compounds after they have been separated from the gas.

5. A method as recited in claim 2 wherein an aqueous solution of the alkali compounds obtained in said dissolving chamber is used in washing the separated gas.

6. A method as recited in claim 2 comprising the further step of combusting the gas after the sublimated alkali compounds have been separated from it.

7. A method as recited in claim 3 comprising the further step of controlling the operation of the circulating bed cooler by controlling the heat recovery from the gas in said heat exchanger near the time the solid particles are separated from the gas.

8. A method as recited in claim 1 wherein the gasifying step is practiced utilizing a plasma generator.

9. A method of recovering alkali chemicals from a material containing dissolved inorganic compounds containing potassium comprising the steps of:
gasifying the material in a reactor by an external heat source at a temperature of over about 1000° C., thus producing gas in which the potassium is substantially in a gaseous state;
cooling the gas by bringing it into contact with an adequate amount of cooled recirculated solid particles in a sublimation chamber of a circulating bed cooler to decrease the temperature of the gas rapidly below the sublimation temperature of the potassium compounds so that said potassium compounds are sublimated onto said solid particles; and
passing the gas and solid particles upwardly through heat exchange means to cool said solid particles; and
separating the solid particles from the gas and recirculating some of said cooled solid particles to said sublimation chamber.

10. A method as recited in claim 9 wherein after separation from the gas, a portion of said solid particles are transported to a dissolving chamber wherein the sublimated compounds are dissolved in water to produce cooking chemicals.

11. A method as recited in claim 10 comprising the further step of recovering heat from the gas in said heat exchanger before the alkali compounds are separated from the gas.

12. A method as recited in claim 10 comprising the further step of recovering heat from the sublimated alkali compounds after they have been separated from the gas.

13. A method as recited in claim 10 wherein the aqueous solution of the alkali compounds obtained in said dissolving chamber is used in washing the separated gas.

14. A method as recited in claim 10 comprising the further step of combusting the gas after the sublimated alkali compounds have been separated from it.

15. A method as recited in claim 9 wherein the gasifying step is practiced utilizing a plasma generator.

16. A method of recovering alkali chemicals from spent pulping liquor containing dissolved organic compounds and dissolved inorganic compounds containing sodium comprising the steps of:
gasifying the spent liquor in a reactor producing gas containing CO, $CO_2$ and $H_2S$ in which the sodium of the spent liquor are in the form of a one monotomic gas;
cooling the gas in a circulating bed cooler in which the gas is brought into contact with an adequate amount of cooled recirculated solid particles to decrease the temperature of the gas rapidly below the sublimation temperature of the sodium so as to produce a solid mixture containing essentially NaOH and $Na_2S$ which are sublimated onto said solid particles;
passing the gas and solid particles including said solid mixture upwardly through a heat exchanger to cool said solid particles; and
separating the solid particles from the gas and recirculating at least some of said solid particles to said circulating bed cooler.

17. A method as recited in claim 16 wherein after separation from the gas, a portion of said solid particles are transported to a dissolving chamber wherein the sublimated compounds are dissolved in water to produce cooking chemicals.

18. A method as recited in claim 16 wherein the gas is cooled in the circulating bed cooler below the temperature of 300° C.

19. A method as recited in claim 16 wherein operation of the circulating bed cooler is controlled by controlling the amount of the recirculated solid particles.

20. A method as recited in claim 16 wherein operation of the circulating bed cooler is controlled by controlling the velocity of the recirculated solid particles.

21. A method of recovering alkali chemicals from spent pulping liquor containing dissolved organic compounds and dissolved inorganic compounds containing potassium comprising the steps of:
gasifying the spent liquor in a reactor producing gas containing CO, $CO_2$ and $H_2S$ in which potassium of the spent liquor is in the form of a gas;
cooling the gas in a circulating bed cooler in which the gas is brought into contact with an adequate amount of cooled recirculated solid particles to decrease the temperature of the gas rapidly below the sublimation temperature of potassium so as to produce a solid mixture containing essentially NaOH and $Na_2S$ which are sublimated onto said solid particles;
passing the gas and solid particles including said solid mixture upwardly through a heat exchanger to cool said solid particles; and
separating the solid particles from the gas and recirculating at least some of said solid particles to said circulating bed cooler.

22. A method as recited in claim 21 wherein after separation from the gas, a portion of said particles are transported to a dissolving chamber wherein the sublimated compounds are dissolved in water to produce cooking chemicals.

23. A method as recited in claim 21 wherein the gas is cooled in the circulating bed cooler below the temperature of 300° C.

24. A method as recited in claim 21 wherein operation of the circulating bed cooler is controlled by controlling the amount of the recirculation solid particles.

25. A method as recited in claim 21 wherein operation of the circulating bed cooler is controlled by controlling the velocity of the recirculated solid particles.

* * * * *